United States Patent [19]

Cordy et al.

[11] 4,151,745

[45] May 1, 1979

[54] ORIFICE METER HAVING TAMPERING INDICATOR

[76] Inventors: Roger W. Cordy, 10623 Larkwood, Corpus Christie, Tex. 78410; William A. Dorris; Robert P. Kelley, both of 1726 Rhew Rd., Corpus Christie, Tex. 78409; William C. Triplett, 3154 Reid Dr., Corpus Christi, Tex. 78404

[21] Appl. No.: 840,032

[22] Filed: Oct. 6, 1977

[51] Int. Cl.² ............................................. G01F 15/00
[52] U.S. Cl. .................................... 73/201; 73/211; 73/272 R; 116/200
[58] Field of Search ................. 73/201, 211, 273, 275, 73/272 R; 116/114 R

[56] References Cited

U.S. PATENT DOCUMENTS

| | | | |
|---|---|---|---|
| 711,191 | 10/1902 | Anderson | 73/273 |
| 855,190 | 5/1907 | Loetzer | 73/273 |
| 1,473,751 | 11/1923 | Walker | 73/201 |
| 1,919,701 | 7/1933 | Morreale et al. | 73/201 |
| 2,585,290 | 2/1952 | Walker | 73/211 |
| 3,355,945 | 12/1967 | Perry | 73/201 |

Primary Examiner—Herbert Goldstein
Attorney, Agent, or Firm—G. Turner Moller

[57] ABSTRACT

An orifice fitting of an orifice meter installation is provided, in accordance with one embodiment of the invention, with a tamper indicating cover positioned in a manner to obstruct access to the bolts which clamp the seal bar into sealing engagement with the fitting housing. Because the path of orifice place movement into and out of the fiting extends through the position normally occupied by the sealing bar, the tampering indicator also spans the path of movement of the orifice plate. The tampering indicator is made of plastic material having an external surface of one color and an internal surface of contrasting color. To gain access to the clamping bolts and to move the orifice plate out of its seated or operative position, the tampering indicator must be destroyed. Destruction of the tampering indicator is visible from a substantial distance. In accordance with another embodiment of the invention, the tamper indicating cover is positioned to obstruct opening movement of the clamping and/or sealing bars.

10 Claims, 9 Drawing Figures

ORIFICE METER HAVING TAMPERING INDICATOR

This invention relates to orifice meters of the type particularly used in the oil field to measure gas transported through a pipeline. More particularly, this invention relates to a technique for indicating whether the orifice fitting of the meter installation has been tampered with.

Orifice meters operate on the principle that gas flow through a pipe is directly proportional to the flowing pressure of the gas stream and the pressure differential between the upstream flowing pressure and the pressure immediately downstream of a flow restriction in the pipe which is provided by a plate having a centrally located opening or orifice therethrough. The amount of pressure differential across the orifice is, of course, directly proportional to the size of the orifice in the plate. Since orifice meters give better results when the pressure differential is within a predetermined range, the size of the orifice selected depends on the amount of gas which is expected to pass the metering station. Accordingly, when the amount of gas changes substantially, it is normally desirable to change the orifice plate so that the pressure differential is within the range that can be accommodated by the pen and chart system which is recording pressure differential. It is also necessary or desirable to periodically inspect the orifice plate to assure that the orifice therein has not been eroded by the gas stream, has not become pitted or otherwise physically damaged to an extent which would change the pressure differential created thereby. It is accordingly necessary and desirable that orifice meters be constructed to allow periodic removal and replacement of orifice plates.

It is, on the other hand, very desirable to know that an orifice plate has not been removed and replaced. If the orifice plate has been replaced with a plate having a larger opening therein, the calculated value of gas passing the meter installation will be substantially lower than has actually occurred. Similarly, if the orifice plate has been replaced with a plate having a smaller opening therethrough, the calculated quantity of gas passing the measuring station will be substantially larger than has actually occurred. This is of considerable importance because the sums paid for gas bought and sold depend on the calculated quantity of gas passing a conventional orifice meter installation. In even a small installation measuring, for example 500 MCF per day, the dollor value of gas approaches $1000 per day based on intrastate natural gas prices. There is accordingly a substantial temptation for either the buyer or the seller of gas to tamper with the orifice plate.

It is known in the prior art to incorporate readily visible tampering indicators for containers as shown in U.S. Pat. Nos. 2,074,490; 3,896,965 and 3,952,869. It will be appreciated, however, that none of these devices relate to orifice fittings nor are the arrangements adapted for such use.

In summary, the device of this invention comprises an orifice fitting of more-or-less conventional design having incorporated therewith a cover which is destroyed or which presents a substantially different appearance when the orifice plate is removed. Typical orifice fittings comprise a housing having a passage therethrough for transporting gas. The passage provides a centrally disposed seat for receiving and positioning an orifice plate substantially perpendicularly to the axis of gas flow. Pressure taps are provided in the passage upstream and downstream of the orifice seat and are connected through suitable piping to a recorder which records the upstream flowing pressure of the orifice plate and the pressure differential across the orifice plate. Means are provided to retain the orifice plate in the seat. In addition, the housing is constructed to provide a path of placement and removal of the orifice plate between the seat and a location external of the housing.

The exact technique for holding the orifice in the seat and the exact technique for removing the orifice plate from the housing depends on the particular design of the fitting manufacturer and the particular model of such manufacturer. In general, orifice fittings are designed either so that the orifice plate can be removed while the pipe is pressurized or, on the other hand, the fittings are designed so as to require that the pressure in the pipe must be bled off before the orifice plate can be removed.

In the design of many orifice fittings, the upper end of the fitting is sealed by a bar forced against an annular or peripheral sealing edge or shoulder by a plurality of bolts which react against a clamping bar which reacts against shoulders provided in the orifice fitting housing. In order to remove the sealing bar, the bolts must be backed off thereby loosening the clamping bar and the sealing bar whereupon the bars can be moved out of the housing, either transversely of the direction of gas flow or vertically. The upper ends of orifice fittings typically provide a pair of external lips in the region of the clamping bar assembly.

The external lips on the orifice fitting housing provide a convenient location to adhesively secure the tampering indicator of this invention. In accordance with one embodiment of the invention, the tampering indicator is designed to span the top of the orifice fitting thereby obstructing access to the bolts which clamp the sealing bars in place and which also obstructs the path of orifice plate removal from its seated position. In accordance with another embodiment of the invention, the tampering indicator is designed to also obstruct the transverse or horizontal path of bar removal.

It is an object of this invention to provide an orifice fitting having a tampering indicator thereon which indicates whether the fitting has been tampered with as well as proving that tampering did, in fact, occur.

Another object of the invention is to provide a tampering indicator in conjunction with an orifice fitting in which the tampering indicator is visible from a great distance.

Other objects and a fuller understanding of the invention may be had by referring to the following description and claims taken in conjunction with the accompanying drawings.

Figure 7:
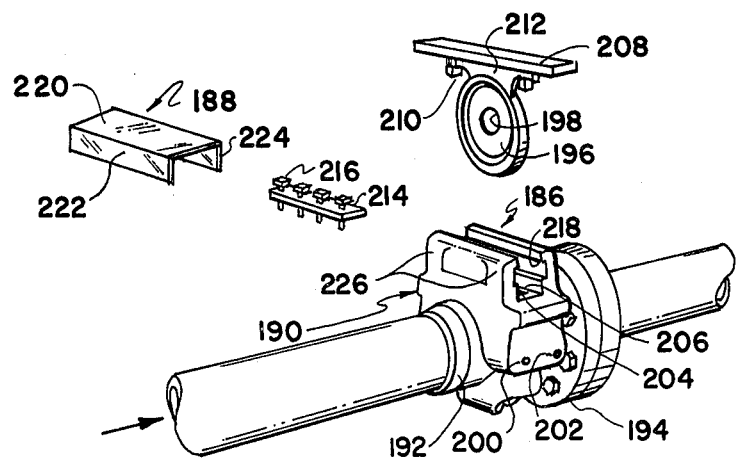
Figure 8:
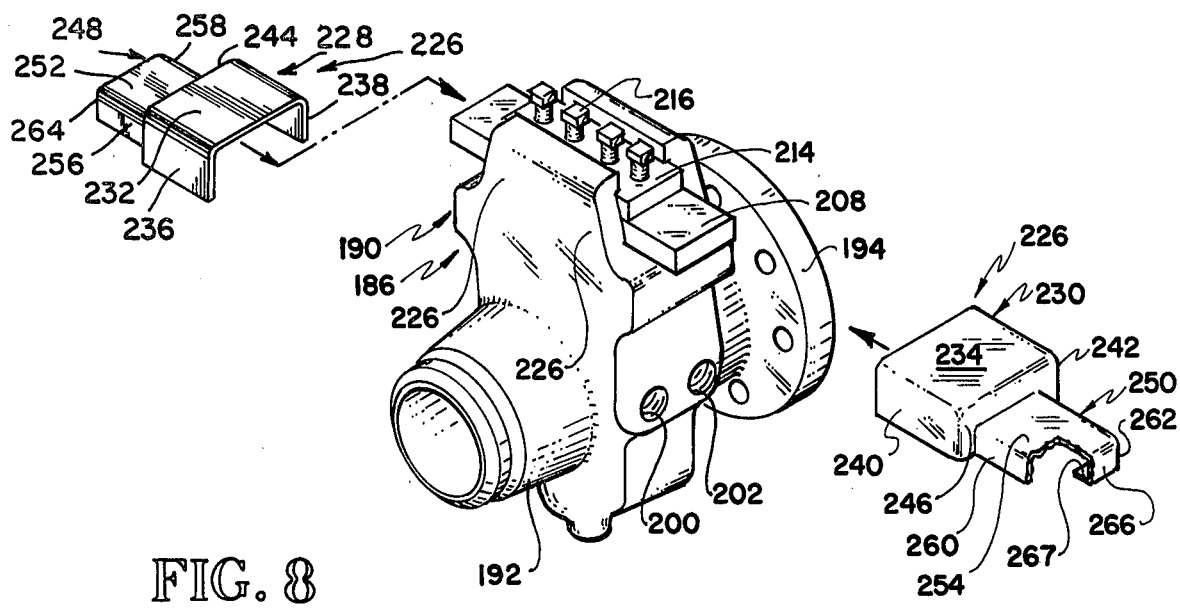
Figure 9:
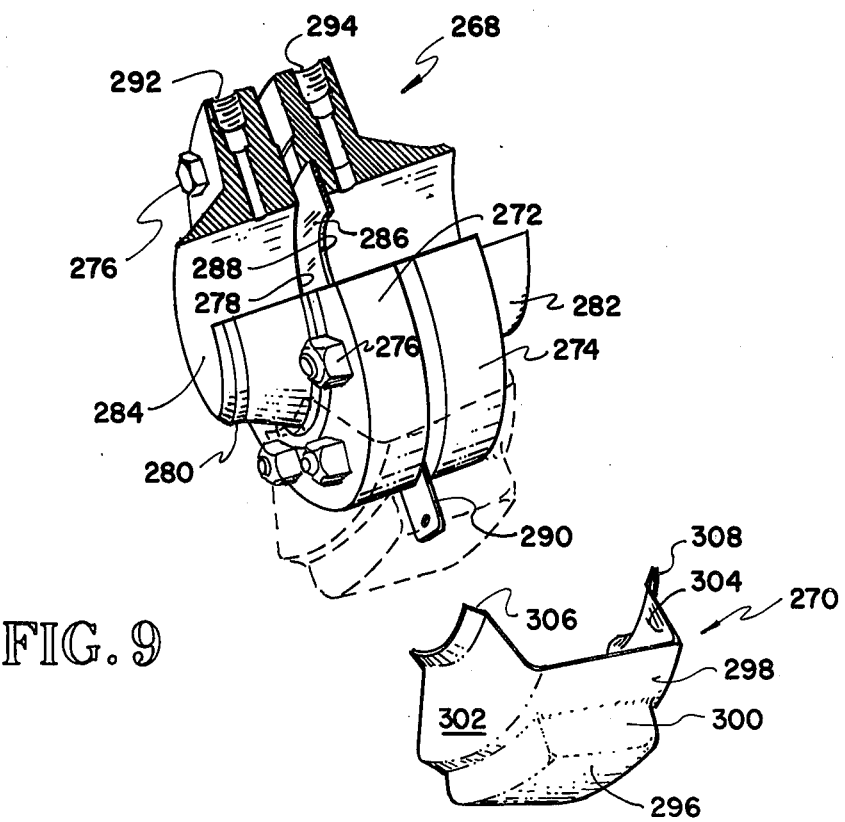

FIG. 7 is an isometric view of a further type of orifice fitting illustrating the clamping bar, orifice plate and tampering indicator of this invention exploded therefrom; and FIG. 8 is an isometric broken view of the orifice fitting of FIG. 7 illustrating another embodiment of this invention; and FIG. 9 is an isometric broken view of a further type of orifice fitting illustrating a cover of this invention exploded therefrom.

Figure 1:
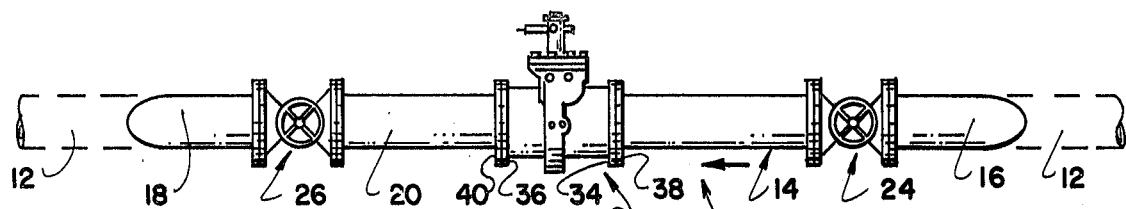
FIG. 1 is a partly schematic top view of a typical orifice metering installation.
Figure 2:
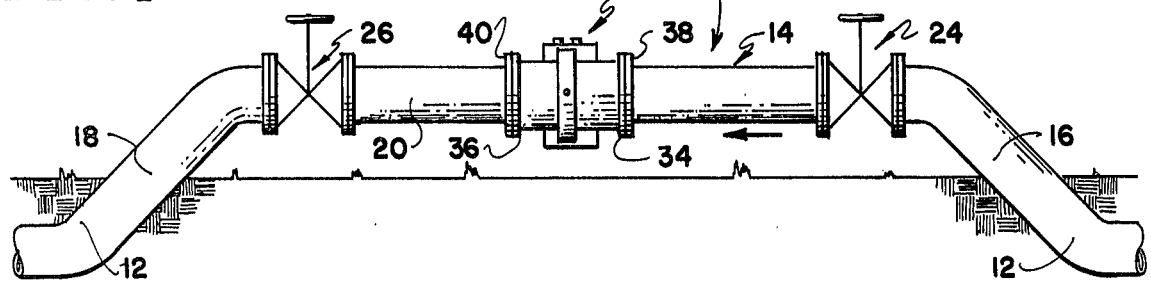
FIG. 2 is a partly schematic side elevational view of FIG. 1.

Referring to FIGS. 1 and 2, there is illustrated an orifice meter installation 10 measuring gas in a pipeline 12. The meter installation 10 includes a meter run 14 comprised of a pair of upwardly inclined pipe sections 16, 18 and a horizontal pipe section 20. An orifice fitting 22 is positioned in the horizontal pipe section 20 as is an upstream valve 24 and a downstream valve 26. The orifice fitting 22 is connected by suitable piping (not shown) to a recorder (not shown) of any suitable type for recording the flowing pressure in the horizontal pipe section 20 upstream of the orifice plate in the fitting 22 and for recording the pressure differential across the orifice plate.

Figure 3:
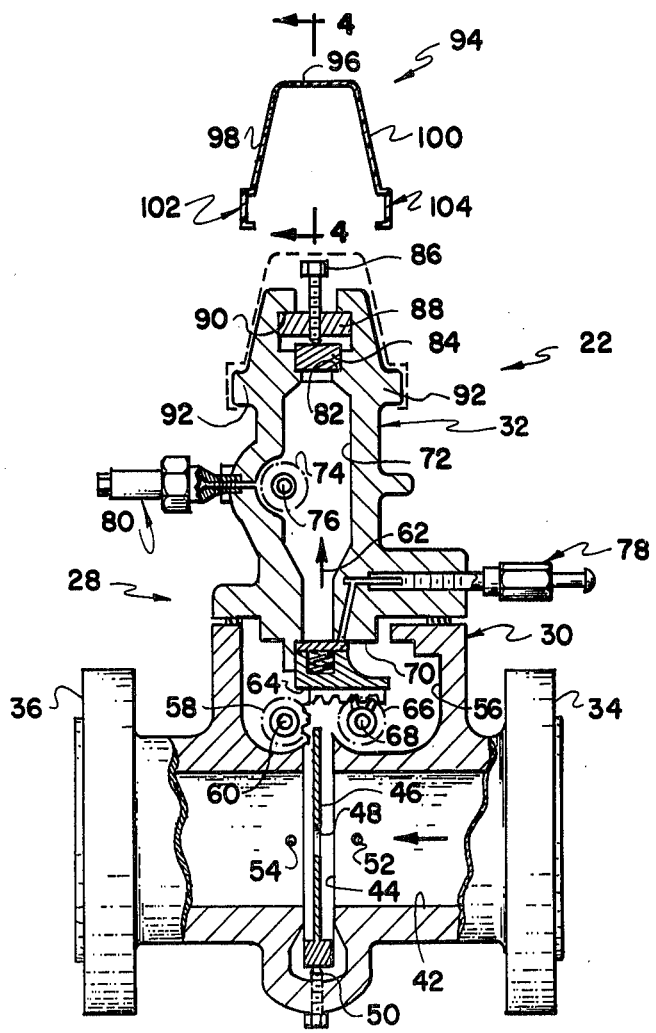
FIG. 3 is a largely broken top view of one type of orifice fitting illustrating the cover of this invention exploded relative thereto.

Referring to FIG. 3, the orifice fitting 22 is illustrated in greater detail. The orifice fitting 22 may be of any suitable type and is illustrated as a "Senior" orifice fitting manufactured by Daniel Industries, Inc. of Houston, Tex. as illustrated in the Composite Catalog of Oil Field Equipment and Services, 1974–75 edition, page 1367.

As will be recognized by those skilled in the art, the orifice fitting 22 comprises a housing 28 made up of a lower housing section 30 and an upper housing section 32. The lower housing section 30 comprises a pair of end fittings 34, 36, such as flanges. The flanges 34, 36 are bolted to similar flanges 38, 40 provided by the horizontal pipe section 20. The housing section 30 provides a passage 42 extending between the flanges 34, 36 having a seat 44 therein for receiving and holding an orifice plate 46 providing an orifice 48 of predetermined size. The orifice plate 46 is supported from one end by the end of a bolt or other threaded member 50. The passage 52 also provides a pair of pressure taps 52, 54 straddling the seat 44 so that the flowing pressure of gas upstream of the orifice plate 46 may be sensed along with the pressure differential across the orifice 48.

The lower housing section 30 also provides an upper chamber 56 having therein a gear 58 meshing with teeth on the orifice plate 46. The gear 58 is affixed to a shaft 60 extending through the wall of the lower housing section 30. As will be more fully pointed out hereinafter, rotation of the shaft 50 causes the orifice plate 46 to move in the direction indicated by the arrow 62.

Also housed in the upper chamber 56 is a slide valve 64 in meshing engagement with a gear 66 affixed to a shaft 68 extending through the wall of the lower housing section 30. It will be apparent that the slide valve 64 seals against a valve seat 70 for purposes more fully explained hereinafter.

The upper housing section 32 comprises a central chamber 72 communicating with the chamber 56 and disposed to receive the orifice plate 46 during movement thereof. A gear 74 is mounted in the chamber 72 on a shaft 76 extending through the wall of the upper housing section 32. As the orifice plate 46 is moved by the gear 58, the orifice plate teeth engage the gear 74 so that cranking on the shaft 76 will act to further move the orifice plate 46. The upper housing section 32 also includes a grease fitting 78 through which the slide valve 64 can be lubricated and a bleed valve assembly 80 for exhausting gas from the chamber 72 as will be more fully pointed out hereinafter.

The upper housing section 32 also comprises an annular or peripheral sealing shoulder or edge 82 which engages a sealing bar 84 to provide a metal-to-metal seal acting to prevent the loss of gas through the end of the housing section 32. The sealing bar 84 is held in place by a plurality of bolts 86 threaded through a clamping bar 88 which reacts against a pair of downwardly facing shoulders 90.

In order to remove the orifice plate 46 from the operative position illustrated in FIG. 3, the shaft 68 is turned from the end thereof outside the housing 28 to move the slide valve 64 to the right as viewed in FIG. 3. The shaft 60 is then rotated from a position exterior of the lower housing section 32 to rotate the gear 58 and move the orifice plate 46 through the upper chamber 56 and into the central chamber 72. Rotation of the shaft 76 from a location exterior of the housing section 32 causes the orifice plate 46 to be moved above the level of the slide valve 64 as viewed in FIG. 3. The shaft 68 is then rotated to move the slide valve 64 back into the position illustrated in FIG. 3. The bleed valve 80 is then actuated to exhaust high pressure gas in the chamber 72. The bolts 86 are backed off to allow the clamping bar to be removed from the housing section 32 by transporting the bar 84 vertically through an opening (not shown) in the end of the housing section 32. The sealing bar 84 is then similarly removed. The shaft 76 is again turned to move the orifice plate 46 out of the chamber 72 to the exterior of the housing 28. The orifice plate 46 can then be checked to determine if the opening 48 has been eroded or pitted and checked to determine whether the diameter thereof is the same as used in the calculations necessary to convert the pressure and pressure differential readings into volumetric readings. The orifice plate 46 is then reinserted into the fitting 22 in a reverse manner. The organization and operation of the orifice fitting 22 will be recognized by those skilled in the art as being typical of Daniel "Senior" orifice fittings. For greater detail in the operation and construction of the orifice fittings 22, reference is made to appropriate publications of Daniel Industries, Inc.

Figure 4:
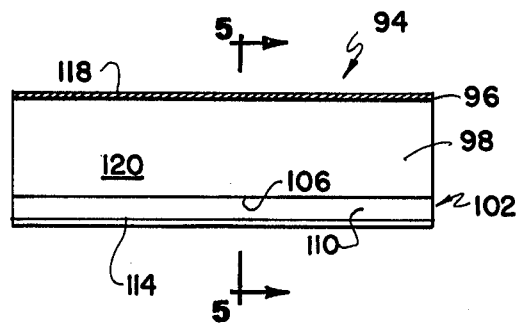
FIG. 4 is an enlarged longitudinal cross-sectional view of the tampering indicator illustrated in FIG. 2.
Figure 5:
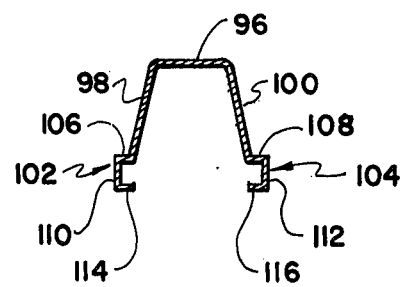
FIG. 5 is a transverse cross-sectional view of the tampering indicator of FIG. 3.

On the exterior of the upper housing section 32 are a pair of lips 92 which are parallel to the bars 84, 88 and which provide a convenient means for attaching a tampering indicating cover 94 of this invention to the fitting housing 28. The tampering indicating cover 94 is best illustrated in FIGS. 3–5 and comprises a generally trough shaped structure having a top wall 96 and a pair of diverging side walls 98, 100 terminating in U-shaped sections or channels 102, 104 respectively. The channels 102, 104 generally face each other and respectively comprise a longitudinally extending wall 106, 108 integral with the side walls 98, 100 and generally parallel to the top wall 96. A pair of webs 110, 112 are integral with the longitudinally extending walls 106, 108 and are generally perpendicular to the plane of the top wall 96. A second pair of longitudinally extending walls 114, 116 are integral with the webs 110, 112 and are parallel to the walls 106, 108.

As is shown in dashed lines in FIG. 3, the U-shaped channels or sections 102, 104 are designed to fit over the external lips 92 of the upper housing section 32. Placement of the cover 94 over the lips 92 can be accomplished in one of two ways. First, the cover 94 may be positioned such that the channels 102, 104 are horizontally aligned with the lips 92 and the cover 94 moved transversely of the direction of gas flow. In the alternative, the cover 94 may exhibit sufficient flexibility to allow the side walls 98, 100 to diverge sufficiently to place the channels 102, 104 around the lips 92.

The cover 94 is desirably sufficiently long to extend over the entire transverse dimension of the upper end of the housing section 32. The cover 94 accordingly desirably spans or obstructs access to all of the bolts 86 and spans at least one or more of the bolts 86.

The cover 94 is preferably adhesively affixed to the housing 28, as by the use of any suitable adhesive such as epoxy resins and the like. The adhesive is conveniently applied to either the interior of the channels 102, 104 or the exterior of the lips 92 immediately prior to the placement of the cover 94 in the dotted line position shown in FIG. 3.

As will be apparent from FIG. 4, the cover 94 includes an external surface 118 and an internal surface 120. The surfaces 118, 120 are desirably of contrasting color. For example, the external surface 118 may be of a dark color, such as black or maroon, while the internal surface 120 may be a light color, such as white or silver. In addition, the external surface 118 is desirably of constrasting color when compared to the remainder of the fitting housing 28. In this fashion, destruction of the tampering indicator 94 can be detected from a substantial distance, such as a helicopter or light plane when checking installations in remote areas.

The material of the cover 94 is desirably sufficiently strong to sustain wind loads, minor abrasion and low grade handling forces but is sufficiently weak so that it can readily be torn, ripped or cut to gain access to the bolts 86. The cover 94 is desirably of non-corrosive material which does not affect the housing 28 of the fitting 22 and is not itself subject to rusting, corrosion or other rapid physical deterioration. Immunity from the elements forever is, of course, not required because, in normal practice, the orifice plate 46 will be checked at least every few months. Accordingly, the material of preference for the cover 94 is an organic polymeric material of which many types may suffice, including polyethylene, polyvinyl chloride, polyurethane, polypropylene and the like. One convenient technique for manufacturing the cover 94 is to procure a sheet of suitable plastic material having one side of one color and the other side of a different color and vacuum forming the sheet to the desired shape.

It will be apparent that the cover 94 must be at least partially destroyed, as by tearing, cutting or chiseling, to gain access to the bolts 86. Even partial destruction of the cover 94 is immediately visible from a substantial distance because of the contrasting colors on the inside and outside thereof. Accordingly, the party who applied the cover 94 will know, upon the next visit to the meter installation 10, that the orifice fitting 22 has been opened to retrieve the orifice plate 46. Thus, the party will be alerted to check the orifice plate 46 to determine if the opening 48 therein is of the correct size.

Figure 6:
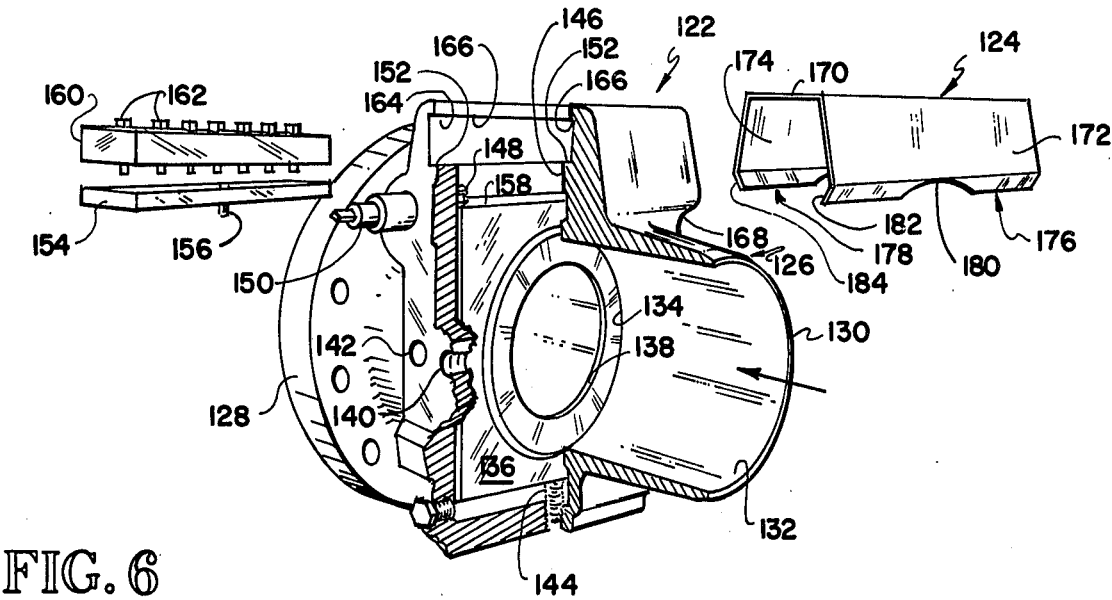
FIG. 6 is a broken perspective view of another type of orifice fitting illustrating the clamping bar and tampering indicator of this invention exploded therefrom.

Referring to FIG. 6, there is illustrated a different type orifice fitting 122 which is equipped with a cover 124 of this invention. The fitting 122 is illustrated as a "Junior" orifice fitting manufactured by Daniel Industries, Inc. of Houston, Tex. and as illustrated on page 1369 of the Composite Catalog of Oil Field Equipment and Services, 1974–75 edition.

The fitting 122 differs from the fitting 22 in that it lacks the capability of removing the orifice plate under pressure. The orifice fitting 122 is illustrated as comprising a housing 126 having end fittings 128, 130 which are illustrated as a flange and a welding neck respectively. A passage 132 extends between the end fittings 128, 130 and provides a centrally disposed seat 134 for an orifice plate 136 having an orifice 138 therethrough. Extending into the passage 132 on opposite sides of the orifice plate 136 are a pair of pressure taps 140, 142 which are connected by suitable piping (not shown) to a recorder (not shown) of any suitable type. A threaded member 144 supports the orifice plate 136 from one side thereof.

The orifice plate 136 is movable through a slot 146 in the housing 126 as may be caused by a gear 148 acting on a rack or linear toothed structure formed on the plate 136. The gear 148 is affixed to a shaft 150 extending through a side of the housing 126. Adjacent the gear 148 is annular or peripheral sealing shoulder or edge 152 providing a metal-to-metal seal with a sealing bar 154 having a threaded member 156 thereon for engaging the end surface 158 of the orifice plate 136 and holding the same against the threaded member 144. Forcing the sealing bar 154 against the sealing shoulder 152 is a clamping bar 160 having a plurality of bolts 162 threaded therethrough. The clamping bar 160 is movable into and out of the housing 126 through an opening 164 in the side thereof and is positioned so that the bar 160 engages a pair of downwardly facing shoulders 166 when the bolts 162 are advanced against the sealing bar 154.

It will be apparent that the orifice plate 136 can be removed from the fitting 122 by closing off the valves upstream and downstream thereof, bleeding the pressure out of the passage 132, removing the clamping bar 160, removing the sealing bar 154 and cranking the plate 136 upwardly through the slot 146 by rotating the shaft 150. The organization and operation of the orifice fitting 122 will be recognized by those skilled in the art as being typical of Daniel "Junior" orifice fittings. For greater detail in the operation and construction of such fittings, reference is made to appropriate publications of Daniel Industries, Inc.

The housing 126 also comprises a plurality of generally parallel external lips 168 located at the corners of the housing 126 in approximately the same plane as the gear 148. The lips 168 accordingly provide a convenient attachment location for the cover 124.

The cover 124 is of generally similar construction to the cover 94 and comprises a top wall 170 and a pair of diverging side walls 172, 174 which terminate in a foot 176, 178 respectively. The feet 176, 178 conveniently comprise an arcuate central cutout 180 to accommodate the central portion of the welding neck 130. The feet 176, 178 are generally configured to nest with the shoulders 168. Accordingly, the feet 176, 178 comprise a pair of generally converging extensions 182, 184 for underlying the shoulders 168.

It will be apparent that installation and use of the cover 124 is substantially the same as the cover 94.

Referring to FIG. 7, there is illustrated another type of orifice fitting 186 which with a cover 188 of this invention may be used. The orifice fitting 186 is illustrated as a "Simplex" orifice fitting made by Daniel Industries, Inc. of Houston, Tex. and as illustrated on page 1370 of the Composite Catalog of Oil Field Equipment and Services, 1974-75 edition. Orifice fittings of this type include a housing 190 having end fittings 192, 194 which are illustrated as being welding neck and a flange respectively but which may be of any suitable type. A flow passage extends through the end fittings 192, 194 and provides an orifice seat therein for receiving an orifice plate 196 having an opening or orifice 198 therein. The housing 190 provides a pressure tap 200, 202 on opposite sides of the seat for sensing upstream flowing pressure and pressure differential across the orifice plate 196.

The housing 190 provides an upwardly directed slot 204 therein allowing for placement and removal of the orifice plate 196. Inside the slot 204 is an annular or peripheral sealing shoulder 206 providing a metal-to-metal seal wih a sealing bar 208 affixed by suitable bolts 210 to a bracket 212 integral with the orifice plate 196. Forcing the sealing bar 208 against the sealing shoulder 206 is a clamping bar 214 having a plurality of bolts 216 thereon. In place, the clamping bar 214 reacts against a pair of shoulders 218 afforded by the housing 190. The organization and operation of the orifice fitting 186 will be recognized by those skilled in the art as being typical of a Daniel "Simplex" orifice fitting. For greater detail in the operation and construction of such fittings, reference is made to appropriate publications of Daniel Industries, Inc.

Referring to FIG. 8, there is illustrated another embodiment of a cover 226 of this invention illustrated in conjunction with the "Simplex" orifice fitting 186 illustrated in FIG. 7. The cover 226 comprises a pair of generally identical cover halves 228, 230 including a top wall 232, 234 which obstructs access to the bolts 216, a pair of side walls 236, 238, 240, 242 which may be adhesively secured to the vertical portions 226 of the housing 190, and end walls 224, 246 which block removal of the clamping bar 214. In addition, the cover halves 228, 230 comprise sections 248, 250 obstructing removal of the sealing bar 208. The sections 248, 250 respectively comprise top walls 252, 254, side walls 256, 258, 260, 262 and end walls 264, 266. The sections 248, 250 also comprise a bottom wall 267 fitted beneath the sealing bar 208 when assembled. Provision of the walls 267 requires that the cover 226 be split into halves for purposes of assembly. In the event the wall 267 is eliminated, the cover 226 could be made in one piece.

It will be apparent that the cover 226, when affixed to the housing 190, not only obstructs access to the bolts 216 but also obstructs movement of the clamping bar 218 laterally out of the housing 190 and obstructs movement of the sealing bar 208 out of the housing 190. Installation of the cover halves 228, 230 is by separately moving each of the cover halves from a laterally disposed location as suggested by the arrows.

Rather than adhesively secure the cover 226 to the flange housing sections 26, the section halves 228, 230 may be connected together after installed on the orifice fitting 186 in any convenient manner, as by adhesively securing the member between the walls 232, 234 or providing the cover halves 228, 230 with an upstanding section perpendicular to the walls 232, 234 which abut in the operative position and which may be adhesively or otherwise secured together.

In the alternative, the embodiment of FIG. 8 may be modified to place an elongate breakable member through an opening provided in the bar 208 and the flange lip immediately therebelow as well as through the wall 254 and then permanently connect the ends of the breakable member together. When an elongate breakable member is so positioned, the member must be broken in order to retrieve the orifice plate in the fitting 186.

Referring to FIG. 9, there is illustrated a different type orifice fitting 268 equipped with a cover 270 of this invention. The fitting 268 is illustrated as an "Orifice Flange" manufactured by Daniel Industries, Inc. of Houston, Tex. and is illustrated on page 1375 of the Composite Catalog of Oil Field Equipment and Services, 1974-75 edition.

The fitting 268 comprises a pair of flanges 272, 274 which are secured together by a plurality of nut and bolt assembleges 276 and which define therebetween an orifice seat 278. Secured to each of the flanges 272, 274 is an end fitting 280, 282 which are illustrated as welding necks but which may be of any suitable type. The flanges 272, 274 and the fittings 280, 282 accordingly comprise a housing providing a central passage 284 having the orifice seat 278 therein for receiving an orifice plate 286 having an orifice 288 therein. Comprising part of the orifice plate 286 is a handle 290 extending out of the fitting 268 between the flanges 272, 274. Extending into the passage 284 on opposite sides of the orifice plate 286 are a pair of pressure taps 292, 294 which are connected by suitable piping (not shown) to a recorder (not shown) of any suitable type for recording values representative of the pressure drop across the orifice plate 286 and the pressure upstream thereof. The organization, assembly, disassembly and operation of the orifice fitting 268 will be recognized by those skilled in the art as being that of a Daniel "Orifice Flange". For greater detail, reference is made to appropriate publications of Daniel Industried, Inc.

In order to remove the orifice plate 286, the nut and bolt assembleges 276 are loosened and at least those in the path of movement of the orifice plate 286 are removed. The flanges 272, 274 are then forced apart slightly and the orifice plate 286 is removed, as by pulling the handle 290. Reassembly of the fitting 268 is in a reverse manner. In order to obstruct access to one or more of the nut and bolt assembleges 276 and to obstruct the path of movement of the orifice plate 286, the cover 270 is provided. The cove 270 comprises a bottom wall 296 spanning the path of movement of the orifice plate 286 and spaced from the arcuate wall 298 by a peripheral wall 300. Extending generally parallel to the flanges 272, 274 and obstructing access to one or more of the nut and bolt assembleges 276 are a pair of side walls 302, 304. The terminus of the side walls 302, 304 comprise a pair of arcuate diverging feet 306, 308 which abut the periphery of the end fittings 280, 282. The cover 270 may be adhesively secured to the orifice flange fitting 268 in any convenient fashion, as by applying adhesive between the feet 306, 308 and the end fittings 280, 282.

It is accordingly evident that the cover 270 acts in three distinct fashions to indicate tampering. First, the cover 270 obstructs the path of placement and removal of the orifice plate 286. Second, the cover 270 obstructs access to the nut and bolt assembleges 276. Third, the cover 270 precludes separation of the flanges 272, 274. It will be apparent that the cover 270 may be designed to operate in any one, rather than all three, of these modes, as for example, by affixing a plurality of spaced strips to the flanges 272, 274 across the interface therebetween.

It will be evident that the cover 270 may be manufactured and used in substantially the same manner as the covers 22, 122, 188. Because it is somewhat cumbersome to remove the orifice plate 286 from the fitting 268, this type fitting is normally selected in those situations where checking of orifice plates is conducted infrequently, if at all. It is this type fitting which may accordingly provide the greatest opportunity for using the device of this invention.

Orifice fittings of the type shown in FIG. 9 typically comprise a pair of taps on radially opposite sides of the fitting. One pair of such taps is used as the pressure taps leading to the recorder. The other pair of pressure taps is normally used as a connection for a drain or pressure blow down valve. If a drain or pressure blow down valve is deemed necessary, the cover 270 could be made with an opening to accommodate the passage thereof, either during manufacture or during installation, as by cutting the plastic material with a knife. In the alternative, the cover 270 could be placed immediately offset from the handle 290 and act as a tampering indicator because of obstructing access to the nut and bolt assembleges 276 rather than blocking movement of the orifice plate 286.

Another desirable feature of the covers 94, 124, 188, 226, 270 is that each cover has a different and distinct indicia thereon to prevent the removal of the cover, retrieval and replacement of the orifice fitting and replacement of the cover without this operation being ascertainable by the individual responsible for the orifice measuring station.

As an alternative, a liquid quick-setting resin of one color may be poured over the bolts and/or flanges of an orifice fitting, followed by the pouring of a second liquid quick-setting resin of a contrasting color. In the event the resin is of low viscosity, a disposable mold (not shown) may be placed around the flanges or bolts to contain the liquid resin until it hardens. A suitable resin which may be used in this fashion is an epoxy resin.

Although the invention has been described in its preferred forms with a certain degree of particularity, it is understood that the present disclosure of the preferred embodiments is by way of example only and that numerous changes in the details of construction and combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

We claim:

1. An orifice fitting comprising
   a housing having a passage therethrough terminating in a pair of end fittings and providing a centrally disposed seat for positioning an orifice plate substantially perpendicularly to the passage, pressure taps upstream and downstream of the seat, and means defining a path of placement and removal of the orifice plate between the seat and a location external of the housing;
   an orifice plate in the seat; and
   a tamper indicating cover, coupled to the housing and blocking the path of placement and removal, providing an interior surface of one color facing the housing and an exterior surface of a contrasting color facing away from the housing.

2. The orifice fitting of claim 1 wherein the color is adhesively affixed to the housing.

3. The orifice fitting of claim 1 wherein the housing comprises a pair of abutted flanges defining the seat therebetween, each flange being permanently affixed to one of the end fittings and means removably joining the flanges together.

4. The orifice fitting of claim 3 wherein the cover comprises a wall spanning the path of placement and removal of the orifice plate and a side wall generally parallel to one of the flanges obstructing access to the removable joining means.

5. An orifice fitting comprising
   a housing providing
     a passage therethrough providing a centrally disposed seat for positioning an orifice plate substantially perpendicularly to the passage and providing pressure taps upstream and downstream of the seat,
     a slot defining a path of placement and removal of the orifice plate between the seat and a location external of the housing, the slot providing a first pair of generally parallel shoulders facing the first shoulder pair, and
     an opening communicating with the slot adjacent the shoulders and extending through the housing transverse to the passage providing a path of bar removal;
   means for holding the orifice plate in operative position in the seat;
   a first flat bar engaging the first shoulder pair and sealing thereagainst;
   means for clamping the first bar against the first shoulder pair including a second flat bar engaging the second shoulder pair and having a plurality of threaded openings therein, and a plurality of threaded members extending through the threaded openings and forcing the first bar toward the first shoulders;
   a tamper indicating cover comprising a trough shaped structure having a first wall spanning opposite sides of the first and second bars and blocking the path of placement in removal of the orifice plate and a pair of spaced depending second walls disposed on opposite sides of a portion of the housing, the second walls terminating in an edge; and
   means adhesively affixing the second walls, adjacent the edge thereof, to an adjacent portion of the housing.

6. The orifice fitting of claim 5 wherein the housing comprises an exterior lip in a plane parallel to the shoulders and the cover comprises a groove receiving the exterior lip.

7. The orifice fitting of claim 4 wherein the cover provides an interior surface of one color facing the housing and an exterior surface of a contrasting color facing away from the housing.

8. The orifice fitting of claim 7 wherein the cover is of generally rectilinear shape, the second walls being generally parallel to each other and generally perpendicular to the first bar, the first wall being generally perpendicular to the second walls and providing an open end.

9. An orifice flange fitting comprising
   a housing including a pair of abutted flanges, each of the flanges providing a flange periphery, an annular flange surface generally perpendicular to the periphery and an end fitting, having a passage therethrough and providing a seat between the flanges for positioning an orifice plate substantially perpendicularly to the passage, providing a slot through the flanges transverse to the passage for receiving an orifice plate handle, and providing pressure taps upstream and downstream of the seat, and a plurality of threaded fastener assemblages securing the flanges together in abutted relation;

an orifice plate in the seat having a handle extending through the slot and projecting past the flange peripheries; and a tamper indicating member having a pair of generally parallel side walls juxtaposing the annular flange surfaces through an arch substantially less than 360° and adhesively fixed to the housing and a transverse wall spanning the side walls and extending across the interface between the flanges at a location intersecting a linear extension of the orifice plate handle.

10. The orifice flange fitting of claim 9 wherein the transverse wall spans the side walls at a location spaced from the flange peripheries beyond the terminus of the orifice plate handle.

* * * * *